US012691712B2

(12) United States Patent
Landis

(10) Patent No.: US 12,691,712 B2
(45) Date of Patent: Jul. 28, 2026

(54) MOTORCYCLE CONNECTING STRAP

(71) Applicant: Eric Michael Landis, Grand Junction, CO (US)

(72) Inventor: Eric Michael Landis, Grand Junction, CO (US)

( * ) Notice: Subject to any disclaimer, the term of this patent is extended or adjusted under 35 U.S.C. 154(b) by 805 days.

(21) Appl. No.: 17/938,584

(22) Filed: Oct. 6, 2022

(65) Prior Publication Data

US 2023/0106104 A1      Apr. 6, 2023

Related U.S. Application Data

(60) Provisional application No. 63/252,730, filed on Oct. 6, 2021.

(51) Int. Cl.
B60D 1/18 (2006.01)
(52) U.S. Cl.
CPC ............. B60D 1/187 (2013.01); B60D 1/182 (2013.01)
(58) Field of Classification Search
CPC .... B60D 2001/003; B60D 1/182; B60D 1/18; B60D 2001/005; B60D 1/187; B60D 1/52
USPC .......................................... 280/480
See application file for complete search history.

(56) References Cited

U.S. PATENT DOCUMENTS 1,386,052 A  *  8/1921  Duggan ................. B60D 1/187
                                            280/480
1,591,105 A  *  7/1926  Rolland ................. B60D 1/187
                                            280/480

5,205,803 A       4/1993  Zemitis
5,518,481 A       5/1996  Darkwah
7,794,374 B1      9/2010  Park
7,798,712 B2      9/2010  Russick
10,384,094 B1  *  8/2019  Newman ............ A63B 21/0557
2007/0232468 A1  10/2007  Levy
2009/0091100 A1   4/2009  Barraza
(Continued)

FOREIGN PATENT DOCUMENTS

GB        2211159 A  *  6/1989  .............. B60D 1/18
JP     2018046789 A  *  3/2018
WO    2011/081534 A1      7/2011

OTHER PUBLICATIONS

Xie, Pet Lead Structure, Mar. 29, 2018, EPO, JP 2018046789 A, Machine Translation of Description (Year: 2018).*
(Continued)

*Primary Examiner* — John Olszewski
*Assistant Examiner* — Matthew D Lee
(74) *Attorney, Agent, or Firm* — Heuton IP Law, LLC

(57)      ABSTRACT

Connecting straps for use for example in sports activities and methods of attaching the connecting straps. In one example, a connecting Y-strap for connecting two motorcycles together includes a body portion including a webbing sleeve and a band of elastic material disposed within the webbing sleeve, the band of elastic material being secured to the webbing material at each of a first end and a second end of the body portion, and first and second peg strap portions extending in a Y configuration from the first end of the body portion. Each of the first and second peg strap portions may have a peg loop formed at respective distal ends of the first and second peg strap portions. Examples of the connecting Y-strap may further include a strap length extending from the second end of the body portion, the strap length having an end loop at its distal end.

18 Claims, 11 Drawing Sheets

(56) References Cited

U.S. PATENT DOCUMENTS

| | | | | |
|---|---|---|---|---|
| 2011/0000440 A1* | 1/2011 | Mucerino, Jr. | ...... | A01K 27/005 |
| | | | | 119/797 |
| 2011/0109062 A1* | 5/2011 | Fincher | ................. | B60D 1/565 |
| | | | | 280/480 |
| 2012/0202659 A1 | 8/2012 | Wroclawsky | | |
| 2013/0067697 A1* | 3/2013 | Huang | ............... | A63B 21/0555 |
| | | | | 24/301 |
| 2013/0068697 A1 | 3/2013 | Featherstone | | |
| 2013/0134689 A1* | 5/2013 | Barajas | ................... | B60D 1/18 |
| | | | | 280/480 |
| 2019/0351968 A1 | 11/2019 | Olszewski | | |

OTHER PUBLICATIONS

"Overview of Materials for Nylon 6, Cast", MatWeb.com, [online], Year: 2017 [retrieved on Nov. 23, 2021]. Retrieved from <url: http://matweb.com/search/DataSheet.aspx?MatGUID= 8d78f3cfc6f49d595896ce6ce6a2ef1&ckck= 1 >, 3 pages.

Notice of Allowance for U.S. Appl. No. 17/318,548, dated Sep. 30, 2021 5 pages.

Nylon Material: Website: http://matweb.com/search/DataSheet.aspx? MatGUID=8d78f3cfcb6f49d595896ce6ce6a2ef1&ckck=1 (Year: 2017).

Official Action for U.S. Appl. No. 16/946,058, dated Jul. 19, 2022 16 pages.

Official Action for U.S. Appl. No. 16/987,523, dated Jul. 6, 2022 7 pages.

Official Action for U.S. Appl. No. 17/318,548, dated Jul. 22, 2021 16 pages.

Notice of Allowance for U.S. Appl. No. 16/946,058, dated Feb. 23, 2023 7 pages.

International Search Report and Written Opinion prepared by the United States Patent and Trademark Office dated Jan. 20, 2023, for International Application No. PCT/US2021/041092.

* cited by examiner

MOTORCYCLE CONNECTING STRAP

CROSS-REFERENCE TO RELATED APPLICATIONS

This application claims priority to U.S. Provisional Application Ser. No. 63/252,730 filed on Oct. 6, 2021, the entire disclosure of which is incorporated herein by reference.

BACKGROUND

When two participants of unequal strength or ability, for example an adult and child, participate in certain sporting or leisure activities together, such as riding bicycles or motor-bikes or skiing together, it can be difficult or even impossible for them to both maintain the same speed. In some cases, such as bicycling uphill, the less proficient participant will fall behind, while in other cases, such as downhill skiing, the less proficient participant may end up unintentionally going too fast and potentially losing control. Thus, for safety and enjoyability of the activity it can be desirable to provide a way to join the two participants together.

However, it is important from a safety standpoint that any type of connecting strap be strong enough to avoid failure due to the forces that will be encountered, not dangle onto the ground or into a rider's wheel, and not jerk either user during use. It is also beneficial if the connection strap is easy to connect and can be quickly and easily disconnected when necessary.

SUMMARY

The present disclosure pertains to connecting straps, and in particular to straps for connecting two persons taking part in a sports activity, or in some cases a person or person-operated vehicle (such as a bicycle or motorbike) and an object to be towed.

Certain aspects are directed to methods and apparatus for connecting two motorcycles together. In particular, certain aspects are directed to a Y-strap for connecting two motor-cycles together, as well as for other uses.

According to some implementations such a connecting Y-strap comprises a body portion including a webbing sleeve and a band of elastic material disposed within the webbing sleeve, the band of elastic material being secured to the webbing material at each of a first end and a second end of the body portion, first and second peg strap portions extending in a Y configuration from the first end of the body portion, each of the first and second peg strap portions having a peg loop formed at respective distal ends of the first and second peg strap portions, and a strap length extending from the second end of the body portion, the strap length having an end loop at its distal end.

Implementations of the Y-strap may include one or more of the following features.

In one example, the first and second peg strap portions are extensions of the webbing sleeve. In another example, the first and second peg strap portions are sewn into the webbing sleeve at the first end of the body portion.

The band of elastic material may have a solid, polygonal cross-sectional shape. The cross-sectional shape of the band may be, for example, square or rectangular.

In some implementations, the webbing sleeve is config-ured for a maximum elongation of 4:1 and the elastic band is configured for a maximum elongation of 7:1. The band may be formed of a natural rubber or thermoplastic elasto-mer, for example, of dipped natural latex. In some cases, the band is configured to pull no more than 18 pounds of weight, for example, no more than 15 pounds of weight, before the webbing sleeve engages and takes the load. The webbing sleeve is configured to prevent the rubber from being over stretched as well as protecting the rubber from UV damage. The webbing sleeve may be formed of polypropylene or nylon.

In certain examples the first and second peg strap portions and the webbing sleeve are made of a substantially inexten-sible material. For example, the first and second peg strap portions may be made of a nylon or woven polypropylene webbing. In some examples, each of the peg strap portions has a width of approximately one inch and a thickness in a range of 0.070 to 0.075 inches. In one example, each of the peg strap portions a breaking strength of 3000 pounds. The peg strap portions may be made of the same material as the webbing sleeve or a different material.

Still other aspects, embodiments, and advantages of these exemplary aspects and embodiments are discussed in detail below. Embodiments and implementations disclosed herein may be combined with other embodiments and implemen-tations in any manner consistent with at least one of the principles disclosed herein.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to connection systems including one or more connection straps and methods of attaching the connection strap(s), that allow two persons to engage in a joint sporting activity or allow a person to tow an object.

Figure 1:
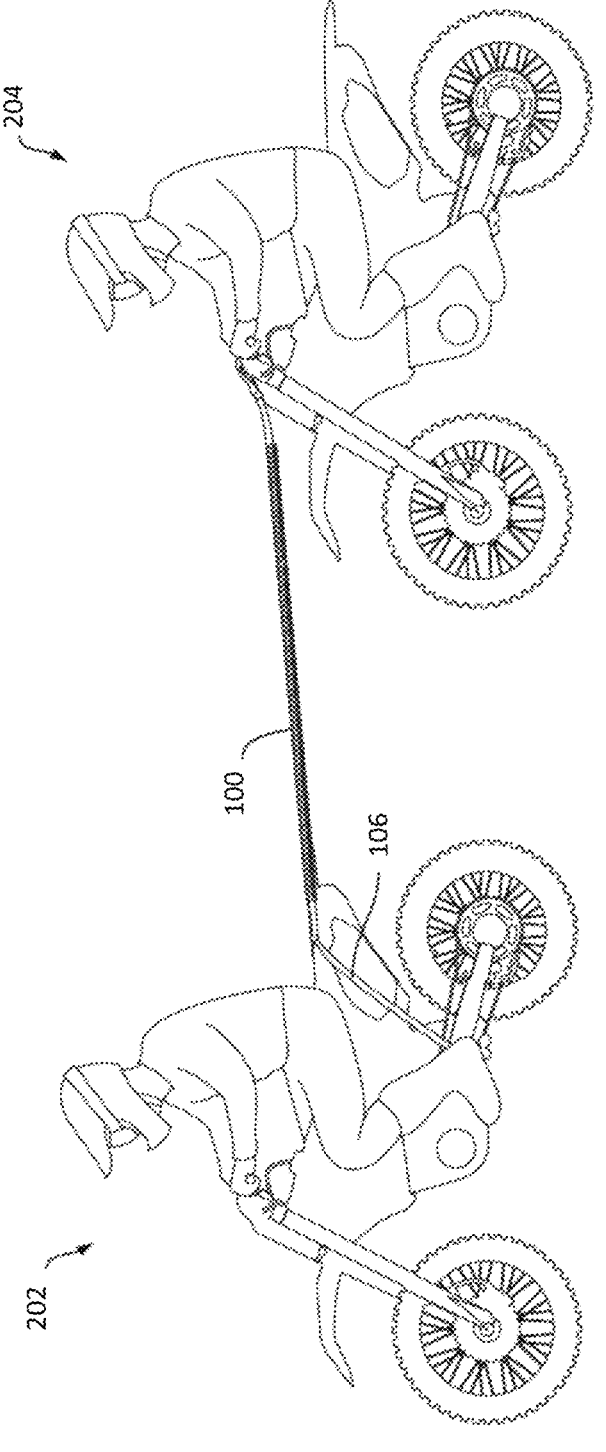
FIG. 1 is a perspective view of a pair of users using a connecting Y-strap according to one implementation while riding motorcycles.

Referring to FIG. 1, according to certain embodiments, a connecting Y-strap 100 is used to allow a pair of users 202, 204 of different abilities to ride motorcycles together. This is but one example of a possible use of the connecting Y-strap 100; many other uses are envisioned, as will be appreciated by those skilled in the art, given the benefit of this disclosure.

Figure 2:
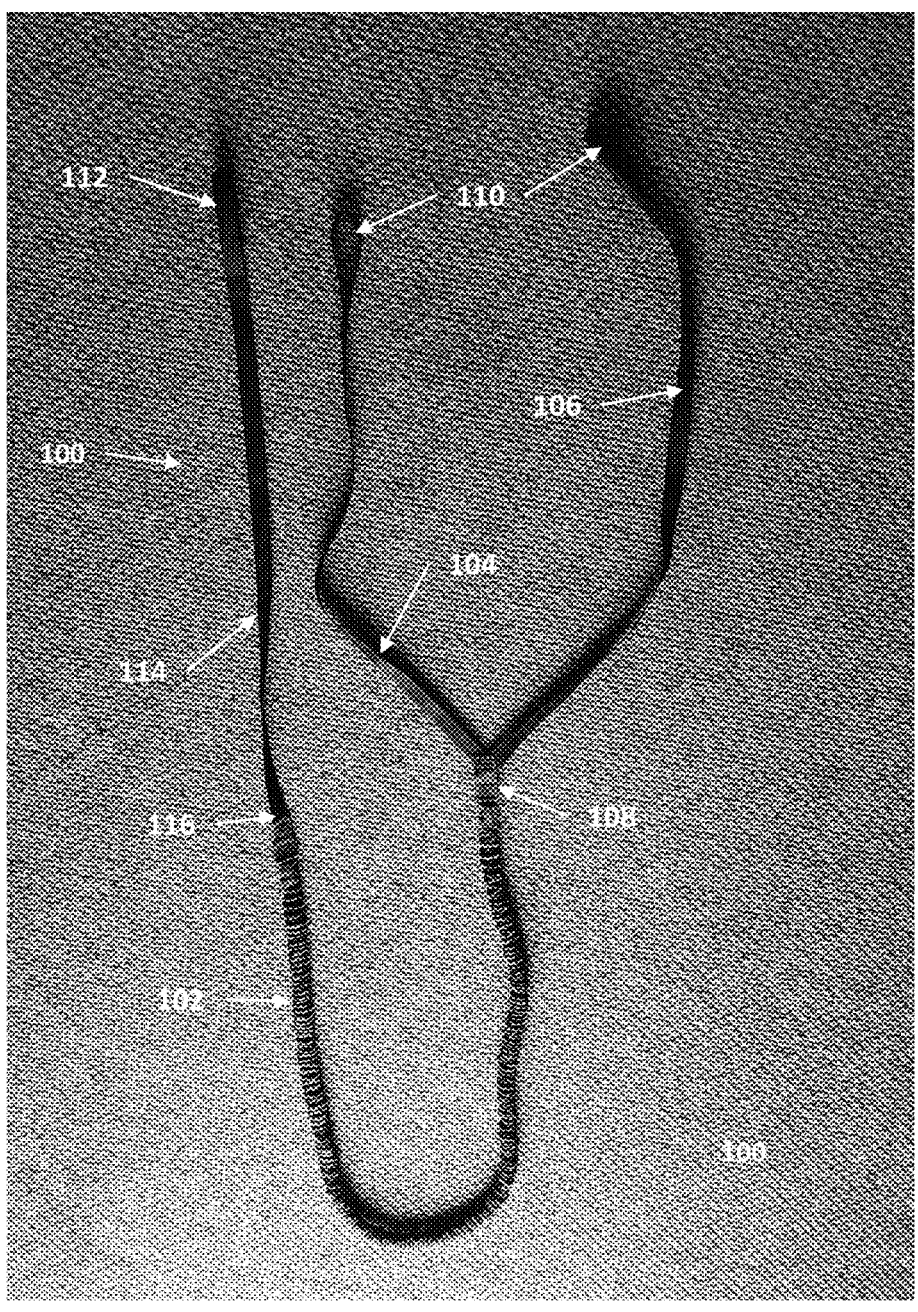
FIG. 2 is a perspective view of one example of a con-necting Y-strap according to certain embodiments.

FIG. 2 illustrates an example of the connecting Y-strap 100 as may be used in the application of FIG. 1, as well as in other applications. According to certain embodiments, the connecting Y-strap 100 includes a body portion 102 and two peg strap portions 104, 106 that extend from the body portion at the base 108 of the Y. Each of the peg strap portions 104, 106 includes a corresponding peg loop 110 at its distal end. At an opposite end of the body portion 102 from the base 108 of the Y, the connecting Y-strap 100 includes an end loop 112. Optionally, and in the embodiment shown in FIG. 2, the connecting Y-strap 100 further includes a strap length 114 positioned between the end 116 of the body portion 102 and the end loop 112.

As shown in FIG. 1, to connect the motorcycles of the two users 202, 204 together, the single end of the connecting Y-strap 100 may be attached to the motorbike of the trailing user 204 using the end loop 112, while the peg strap portions 104, 106 are looped over and attached to the motorbike of the leading user 202.

Referring to FIGS. 1, 2, 3A and 3B, the peg strap portions 104, 106 may be draped over the back of the motorbike 206, optionally over an extending portion 208 that extends rearwards (over the rear wheel 210) from the seat 212, and the peg loops 110 may be hooked around respective foot pegs 214 of the motorbike 206. This arrangement securely attaches the peg strap portions 104, 106 on both sides of the motorcycle 206 and allows quick and easy attachment and removal. Rearward pulling force or tension from the connecting Y-strap 100 creates some pressure on the top of the motorcycle 206, but the towing load is put onto the foot pegs 214 which typically are bolted to the frame of the motorcycle, thus making for a very strong and safe anchor. In addition, by draping over the top of the motorcycle 206 (e.g., over the seat 212 and/or the portion 208 behind the first user 202) the connecting Y-strap 100 is held up high away from the rear tire of the motorbike, thereby preventing the connecting Y-strap 10 from getting caught in the rear wheel 210.

Connection to the motorbike of the trailing user 204 may be made in a variety of different ways. In one example, the end loop 112 of the connecting Y-strap 100 may be looped or hitched around a feature on the trailing motorbike such as a portion of the handlebars, for example. In another example, the connecting Y-strap 100 may be girth hitched directly to the handlebars or frame of the trailing motorbike by being looped through itself. However, in other examples, another supplemental strap may be used to attach the connecting Y-strap 100 to the trailing motorbike. For example, a supplemental strap, referred to as a release strap, may be used to attach the connecting Y-strap 100 to the motorbike (or bicycle) of the trailing user 204, as described in commonly owned U.S. Patent Publication No. 2020/0398621, for example, which is hereby incorporated by reference in its entirety. The release strap is a friction-based instant detachment system accessory for the connecting Y-strap 100 that is looped through the end loop 112 of the connecting Y-strap, wound around a portion of the motorbike or bicycle of the trailing user 204 (e.g., around the handlebars or stem) to allow the load to transferred to the motorbike or bicycle, and gripped by the trailing user 204, as described in U.S. Patent Publication No. 2020/0398621.

Figure 4:
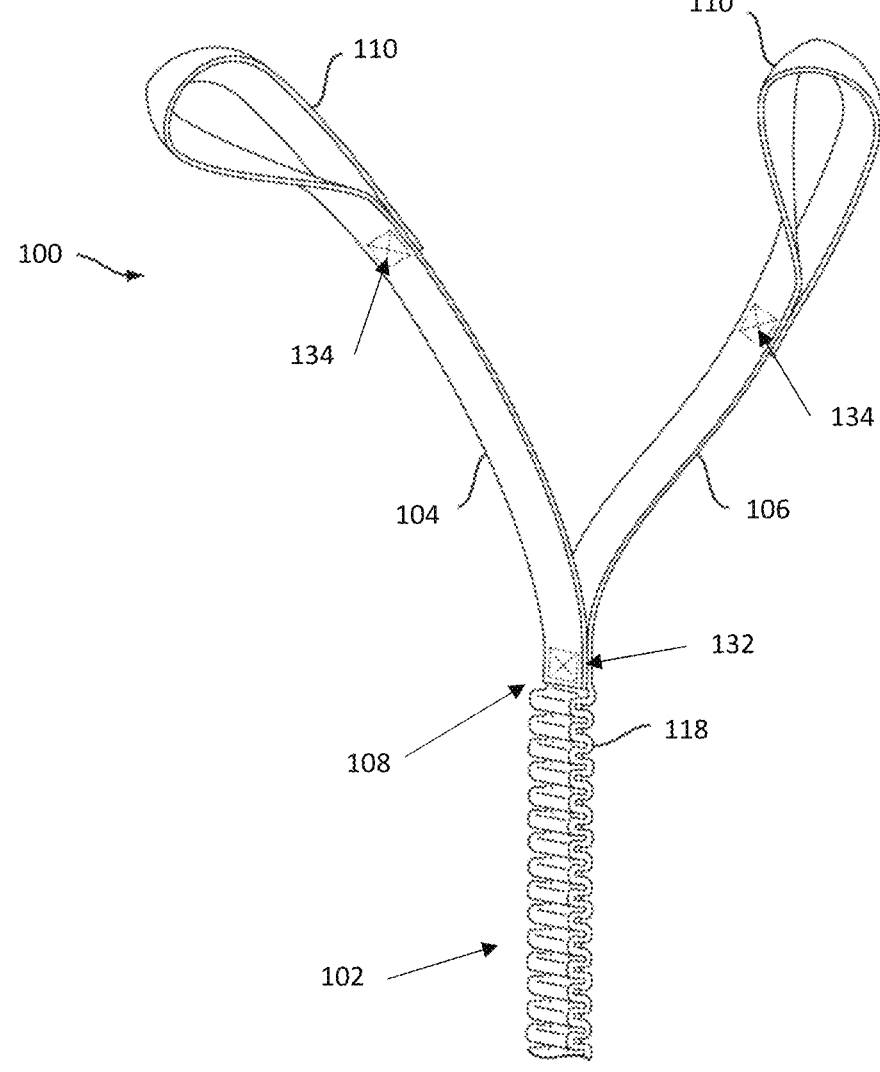
FIG. 4 is a perspective view showing a portion of one example of a connecting Y-strap according to certain embodiments.
Figure 5:
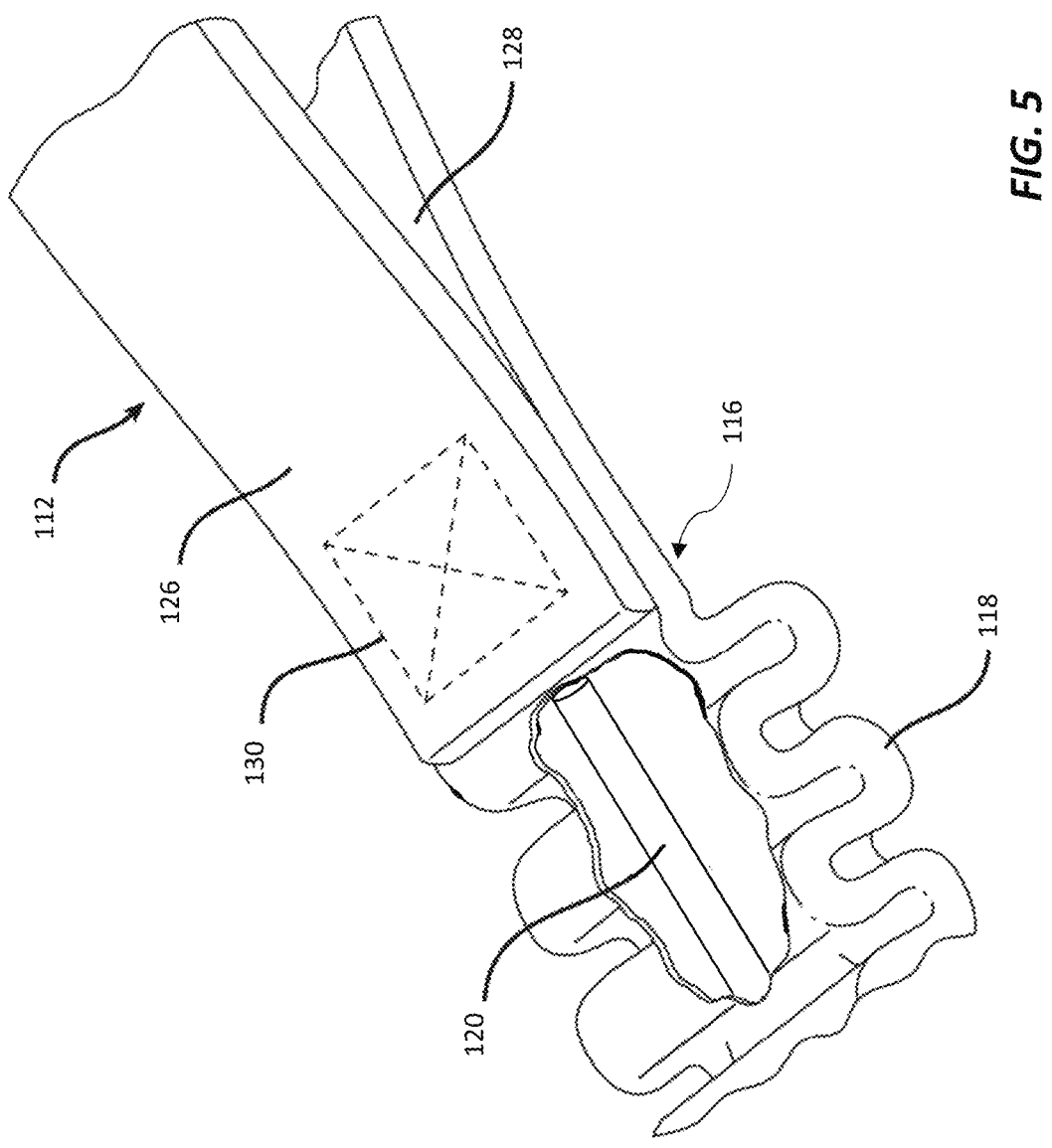
FIG. 5 is an enlarged, partially cut-away perspective view showing a portion of the webbing sleeve, inner elastic band, and end loop of an example of connecting Y-strap according to certain embodiments.

Referring now to FIGS. 2, 4, and 5, according to certain embodiments, the body portion 102 of the connecting Y-strap 100 includes an outer sleeve 118 of webbing material which may be formed, for example, of a substantially inelastic (inextensible) material, such as woven polypropylene or Nylon. As shown in FIG. 5, a band of elastic material 120 is disposed within the webbing sleeve 118. The elastic band 120 is secured within the sleeve 118 at two attachment points, corresponding to the locations of the base 108 of the Y and the other end 116 of the body portion 102. The elastic band 120 may be secured to the webbing sleeve 118 at the base 108 of the Y using stitching 132. The stitching 132 may include bar tack stitching, for example. In the example illustrated in FIG. 5, the end 116 of the body portion 102 corresponds to the base of the end loop 112; however, in other examples, the strap length 114 may be positioned between the end 116 of the body portion 102 and the base of the end loop 112, as discussed above. In either case, the elastic band 120 is secured to the webbing sleeve 118 at the end 116 of the body portion 102 and does not extend with or into the strap length 114. In certain examples, the elastic band 120 includes a single length of elastic, as shown in FIG. 5. In other examples, the elastic band 108 includes a continuous loop of elastic, as described in commonly-owned U.S. Patent Publication No. 2020/0398099, for example, which is hereby incorporated by reference in its entirety.

In certain examples, the elastic band 120 has a circular cross-section, as shown in FIG. 5; however, in other examples, the elastic band 120 may have a square cross-section, or a cross-section of another shape (e.g., rectangular or oval). In some examples, the elastic band 120 is formed of hollow tubing. In other examples, the elastic band 120 is solid rather than hollow.

Figures 6A, 6B:
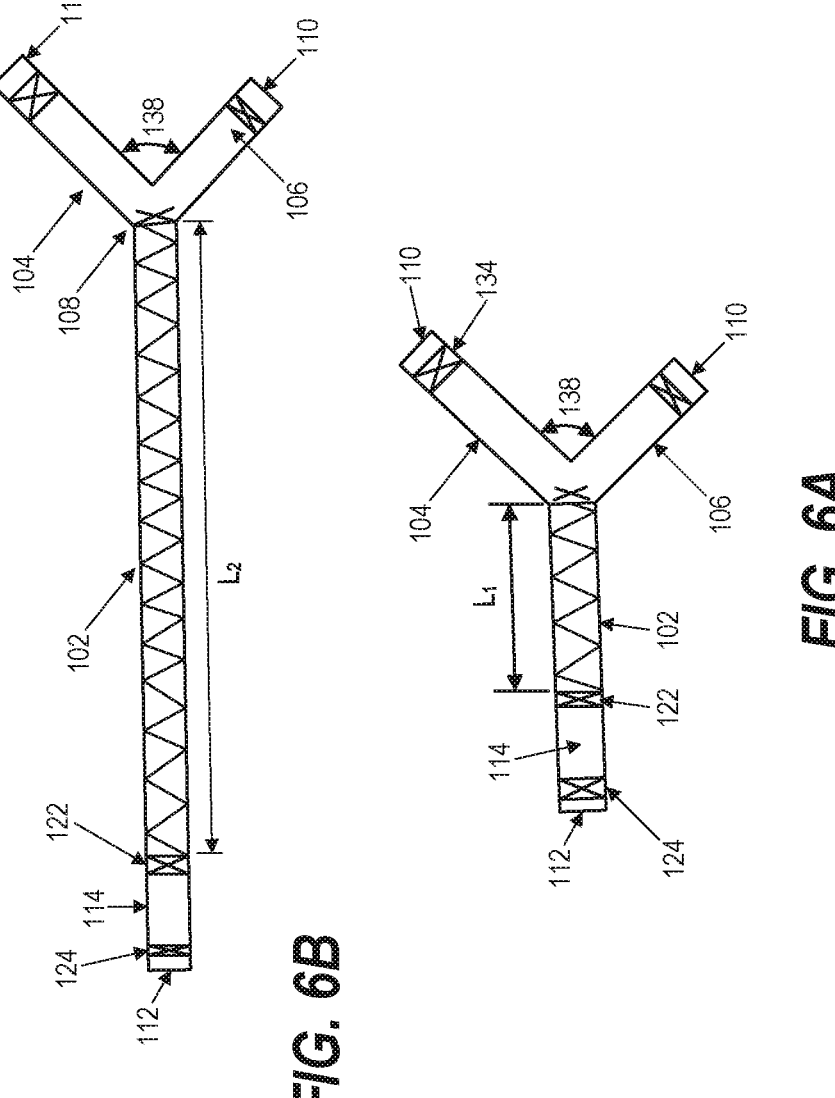
FIG. 6A is sketch showing a side view of an example of the connecting Y-strap in a fully relaxed (unstretched) con-dition.
FIG. 6B is a sketch showing a side view of the example of the connecting Y-strap in a fully extended (stretched) condition, in which the webbing prevents over-stretching of the elastic band.

According to certain embodiments, the webbing material itself is substantially inextensible, but the webbing sleeve 118 is bunched up relative to the inner elastic band 120 during manufacture so that the sleeve can be extended to a much greater length by pulling on the opposite ends (108, 116) of the body portion 102. For example, the ratio between the length $L_1$ of the webbing sleeve 118 in the fully relaxed (bunched up) state (FIG. 6A) and the length $L_2$ in the fully extended state (FIG. 6B) may be from about 1:3 to 1:4 (a stretch ratio of 3:1 to 4:1). The use of webbing in this bunched up arrangement around an elastic core is well known in the dog leash art. $L_1$ may be, for example, in a range of about (±1 inch) 45 to 65 inches, and in one example, may be approximately (±1 inch) 60 inches. $L_2$ may be in a range from about (±1 inch) 160 to 200 inches, and in one example may be approximately (±1 inch) 180 inches.

The inner elastic band 120 is formed of a natural or synthetic rubber material that has greater extensibility than the webbing sleeve 118. For example, the elasticity of the elastic band 120 may be such that the elastic band could, if not inhibited by the webbing sleeve 118, stretch to at least 4 times its relaxed length, i.e., have a stretch ratio of at least 4:1. In some implementations, the elastic band 120 can stretch to 6 or more times its relaxed length, e.g., the band may have a stretch ratio of greater than 6:1 or even 7:1 or more. Because the elastic band 120 is not fully stretched when further stretching is stopped by full extension of the webbing sleeve 118 there is a safety factor to prevent inadvertent breaking of the elastic band during use. It is preferred for many applications that the webbing forming the sleeve 118 have a tensile strength of at least 1000 lbs., preferably at least 1500 lbs.

In some embodiments, the elastic band 120 is preferably configured such that it pulls no more than 18 pounds, and in some implementations, no more than 15 pounds (for example, between 13 and 18 pounds) at the point at which it is fully extended to length $L_2$ (at which point the webbing sleeve 118 takes any additional load).

According to certain embodiments, the strap length 114 may be made of a webbing, rope, or other strap material that is sewn into the end 116 of the body portion 102 using stitching 122. The stitching 122 may include bar tack stitching, for example. The strap length may have a length in a range of about (±1 inch) 30 to 40 inches, and in one example may be approximately (±1 inch) 36 inches in length. The end loop 122 may be formed by folding the strap material of the strap length 114 back onto itself and securing the free end with stitching 124. It is generally preferred that the end loop 112 be large enough to allow easy attachment to the handlebars or other feature on the motorbike, as discussed above. In some implementations, the end loop 112 has a length when flattened against a surface, in a range of about 3 to 6 inches, preferably approximately 5 inches (±1 inch). In some cases, the end loop 112 may be longer, or of adjustable length, or have other features, as discussed further below.

In examples in which the connecting Y-strap 100 does not include the strap length 114, such as in the example shown in FIG. 5, the end loop 112 may be integrally formed with the webbing sleeve 118. For example, the end loops 112 may be formed by doubling a free end 126 of the sleeve 118 back and securing the free end 126 to the standing end 128 with stitching 130, thereby forming the base of the loop (at the end 116 of the body portion 102) with one continuous piece of webbing. The stitching 130 may include bar tack stitching, for example. In certain examples, the elastic band 120 may be secured to the webbing sleeve 118 at the base of the end loop 112 using the same stitching 130 that extends through the free end 126 and standing end 128 of the webbing 118. Alternatively, in examples in which the connecting Y-strap 100 includes the strap length 114, the elastic band 120 may be secured to the webbing sleeve 118 using the stitching 122 that is used to secure the strap length 114 to the webbing sleeve 118, or using additional stitching.

In further examples, the strap length 114 may be integrally formed with the webbing sleeve 118 and may include an extension of the webbing sleeve 118 that extends beyond the end 116 of the body portion 102 where the attachment of the elastic band 120 to the webbing sleeve 118 occurs. In such examples, the end loop 112 is similarly integrally formed with the webbing sleeve 118, with the stitching 124 separating the end loop 112 from the remainder of the strap length 114 and defining the length of the end loop 112. In these examples, the stitching 122 secures the elastic band 120 to the webbing sleeve 118 and defines the end 116 of the body portion 102.

According to certain embodiments, the two peg strap portions 104 and 106 may be made of a webbing, rope, or other strap material that is sewn into one end of the body portion 102 at the base 108 of the Y. Alternatively, the two peg strap portions 104 and 106 may include extensions of the outer sleeve 118 of webbing material of the connecting Y-strap 100. For example, the free end 126 and the standing end 128 of the webbing may extend beyond the attachment area 116 of the elastic band 120, thereby forming the peg strap portions 104 and 106.

Referring to FIG. 4, the peg loops 110 may be formed by folding free ends of the peg strap portions 104, 106 back on itself and stitching the end to the strap (using stitching 134) to form a loop. Alternatively, the peg loops 110 may be formed using any method known for forming loops in the rope or strapping arts. The peg loops 110 should be sufficiently sized to fit easily around the foot pegs 214, but not so large that they could easily slip off during use. In certain examples, the peg loops 110 each has a length (measured when flattened against a surface) in a range of about 3 to 7 inches, and in one example, the length of each peg loop 110 is approximately (±1 inch) 5 inches. In other embodiments, peg loops 110 may have a different size, optionally depending on the size or configuration of the motorcycle (or other vehicle/object) with which the connecting Y-strap 100 is to be used.

The peg strap portions 104, 106 may be made of any of various different materials.

Figure 3A:
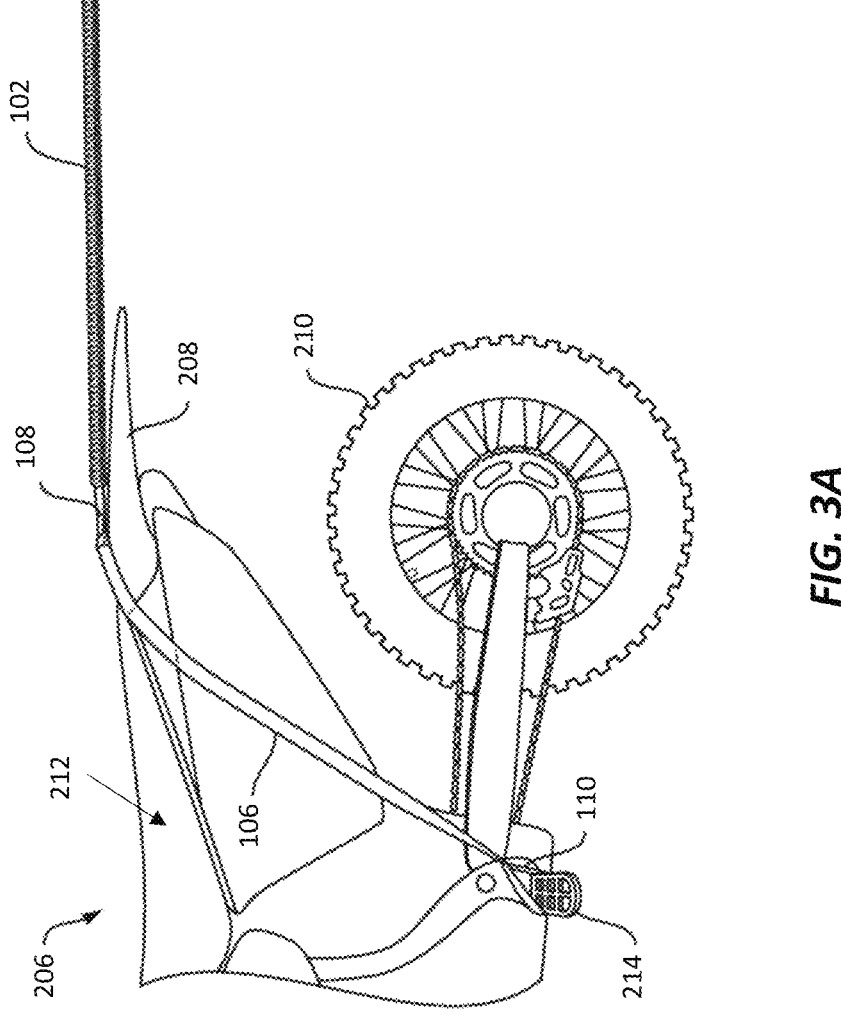
FIG. 3A is a side perspective view showing an example of a connecting Y-strap attached to a motorcycle.
Figure 3B:
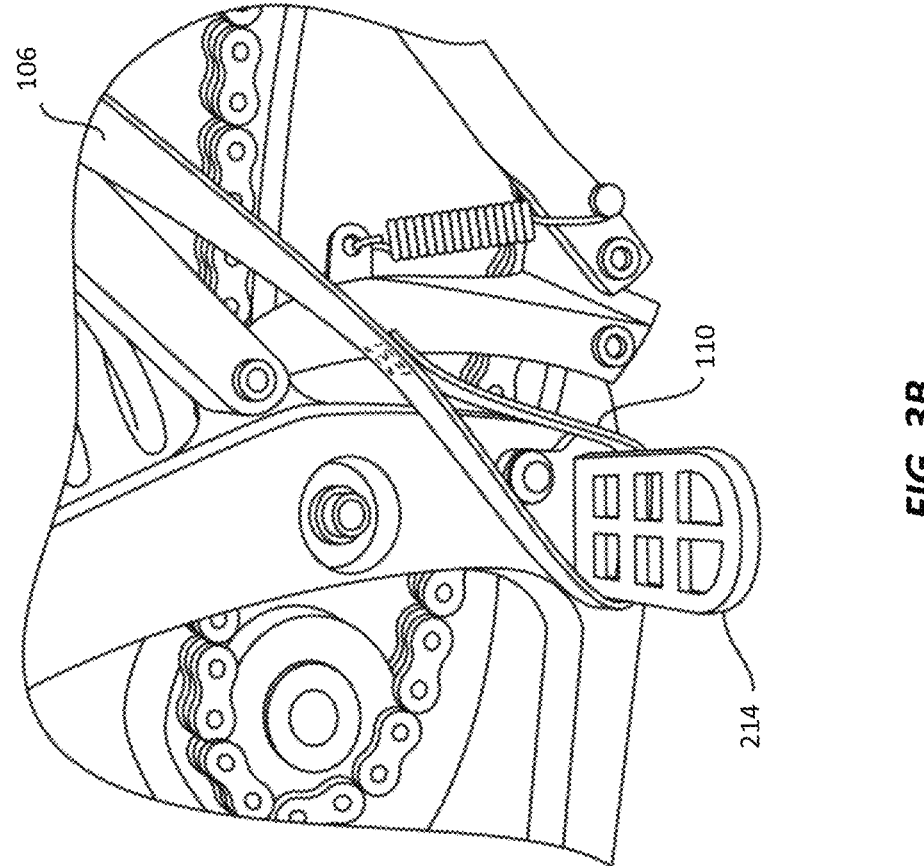
FIG. 3B is a more detailed view of a portion of FIG. 3A showing a peg strap portion of the connecting Y-strap attached to the foot peg of the motorcycle.

Embodiments of the peg strap portions 104, 106 should be strong enough to handle the forces that may be encountered during the activity and not break during use. In addition, the peg strap portions 104, 106 may made of a material that is substantially inextensible. In one example, the peg strap portions 104, 106 are two portions/regions of one single length of strap material that is sewn into the webbing sleeve 118 at the base 108 of the Y. In other examples, each peg strap portion 104, 106 is a separate piece of material that is sewn into the webbing sleeve 118 at the base 108 of the Y. The lengths of the peg strap portions 104, 106 may be selected such that the peg strap portions 104, 106 hook over the motorcycle 206 onto the left and right foot pegs 214 with enough length to pull backward on the motorcycle 206 toward the end of the seat 212 (as shown in FIG. 3A), but not too far to pull off the back of the motorcycle.

In one example, the peg strap portions 104, 106 are made of a nylon webbing having a width of approximately one inch and a thickness in a range of 0.070 to 0.075 inches. However, in other examples, the peg strap portions 104, 106 may be made of a nylon or woven polypropylene webbing with different dimensions. In one example, the nylon webbing has a breaking strength of 3000 pounds, with a maximum recommended working load of 1000 pounds. In addition, in one example, the nylon webbing has a melting point of 380 degrees Fahrenheit. However, in other examples, the peg strap portions 104, 106 may be made of other materials, including any rope, webbing, strapping, or other material having sufficient strength (i.e., capable of handling a working load of at least 1000 pounds) and flexibility.

Figure 7:
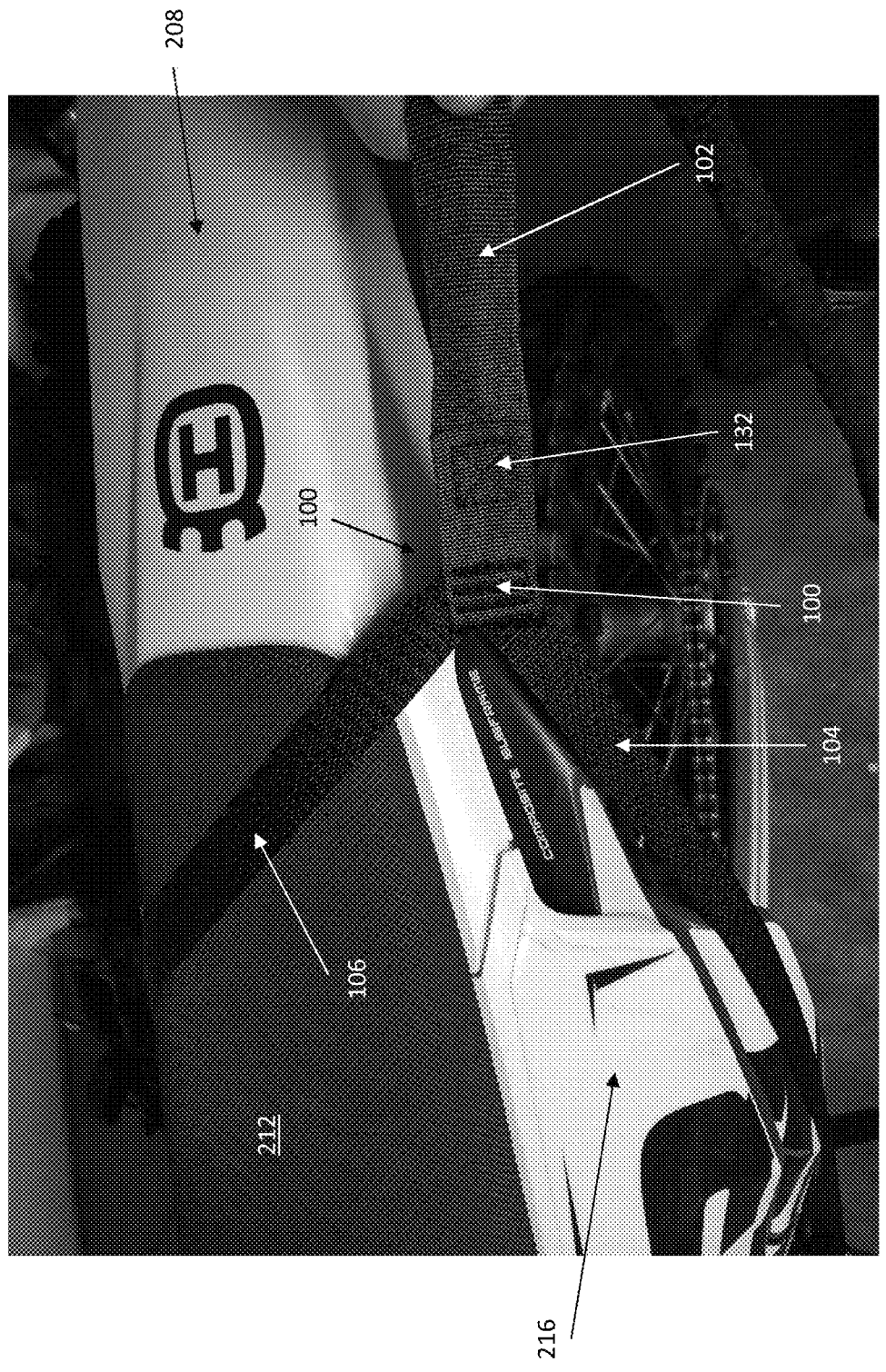
FIG. 7 is a top view showing a portion of a motorcycle and an example of the connecting Y-strap according to certain embodiments.

In many instances, the motorcycle 206 may include an exhaust manifold 216 on one side of the motorcycle, as shown in FIG. 7. Accordingly, in certain examples, the peg strap portions 104, 106 may have different lengths to accommodate the exhaust manifold 216 on one side of the motorcycle 206, such that the connecting Y-strap 100 has an asymmetrical Y formation. For example, the peg strap portion 104 may longer than the peg strap portion 106. In one example, the peg strap portion 104 may have a length of approximately (±1 inch) 37 inches, whereas the peg strap portion 106 may have a length of approximately (±1 inch) 33 inches. The connecting Y-strap 100 may be positioned on and attached to the motorcycle 204 such that the longer peg strap portion 104 is placed on the side of the motorcycle where the exhaust manifold 216 is located, so as to center the load on the connecting Y-strap 100. As shown in FIG. 7, when the connecting Y-strap 100 is so positioned and tension is placed on the connecting Y-strap 100, the base 108 of the Y is pulled slightly to one side of the seat 212 and the extending portion 208.

FIG. 7 also shows an example of attachment of the peg strap portions 104, 106 to the body portion 102 of the connecting Y-strap 100, according to certain embodiments. In this example, a free end of webbing sleeve 118 is folded back onto itself and secured using the stitching 132, thus forming a small loop at the end of the body portion 102. One or two lengths of peg strap material forming the peg strap portions 104, 106 may be passed into/through this small loop and secured to the webbing sleeve 118 using stitching 136. In the example shown in FIG. 7, the stitching 136 includes three rows of stitching to make a secure attachment between the peg strap material and the webbing sleeve 118; however, any type and arrangement of stitching 136 may be used provided that it securely attaches the peg strap material to the webbing sleeve 118.

Referring again to FIGS. 6A and 6B, in certain examples, the peg strap portions 104, 106 are stitched into the webbing sleeve 118 such that an angle 138 formed between the peg strap portion 104 and the peg strap portion 106 is approximately 90 degrees.

As discussed above, in certain applications, the connecting Y-strap 100 may be girth hitched at one end to a bicycle, motorcycle or other object by passing the Y-strap 100 through the end loop 112 and pulling the connection tight. In some instances, when the girth hitch knot is pulled tight, it can be difficult to loosen the knot to disconnect the connecting Y-strap 100. Accordingly, to address this problem, embodiments of the connecting Y-strap 100 include a feature that makes it easier to disconnect the connecting Y-strap when it is girth hitched through its own cnd loop 112.

Figure 8:
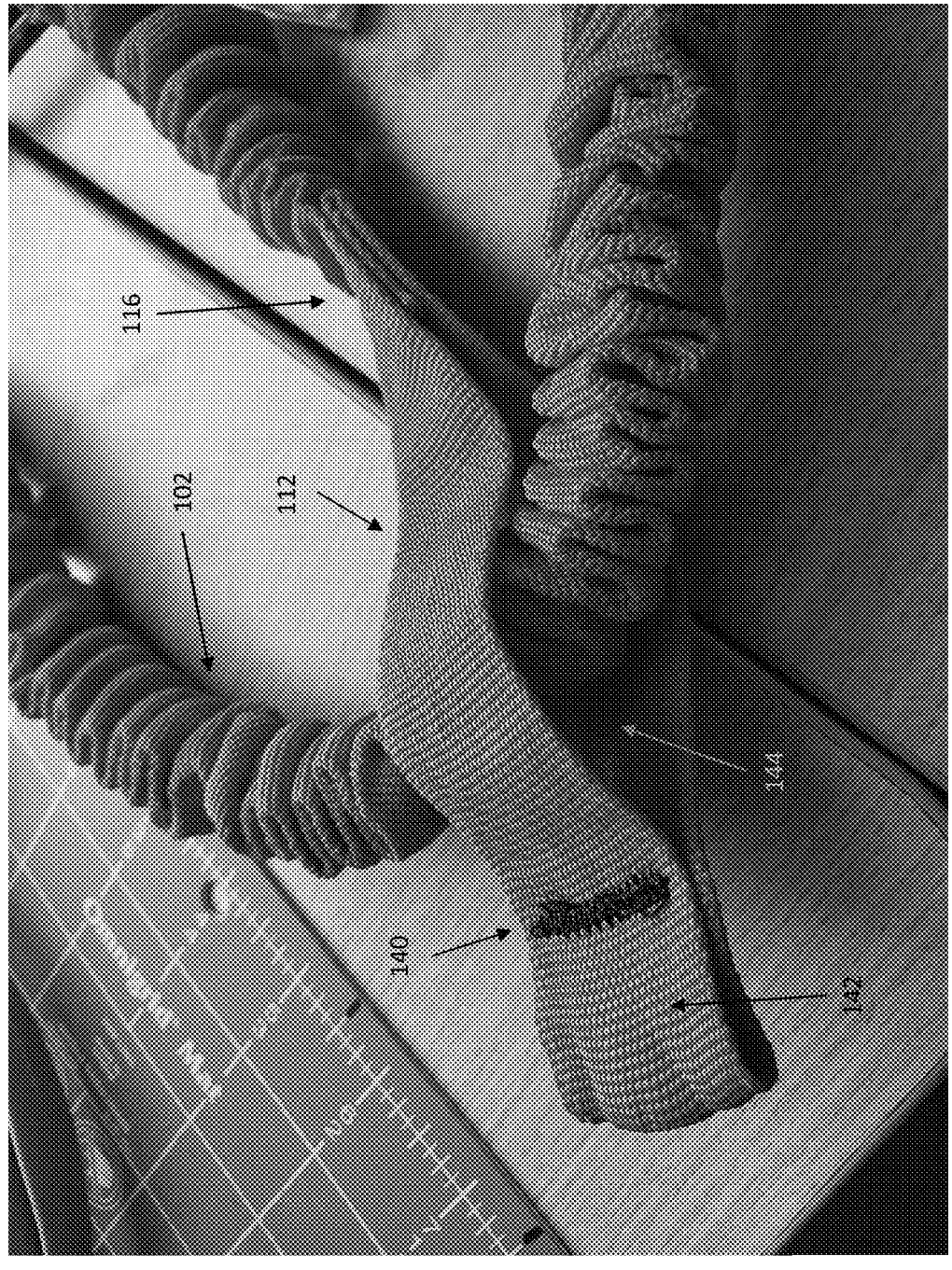
FIG. 8 is a perspective view showing a portion of the connecting Y-strap in a girth hitch configuration and having a pull tab at the tip of the end loop, according to certain embodiments.
Figure 9:
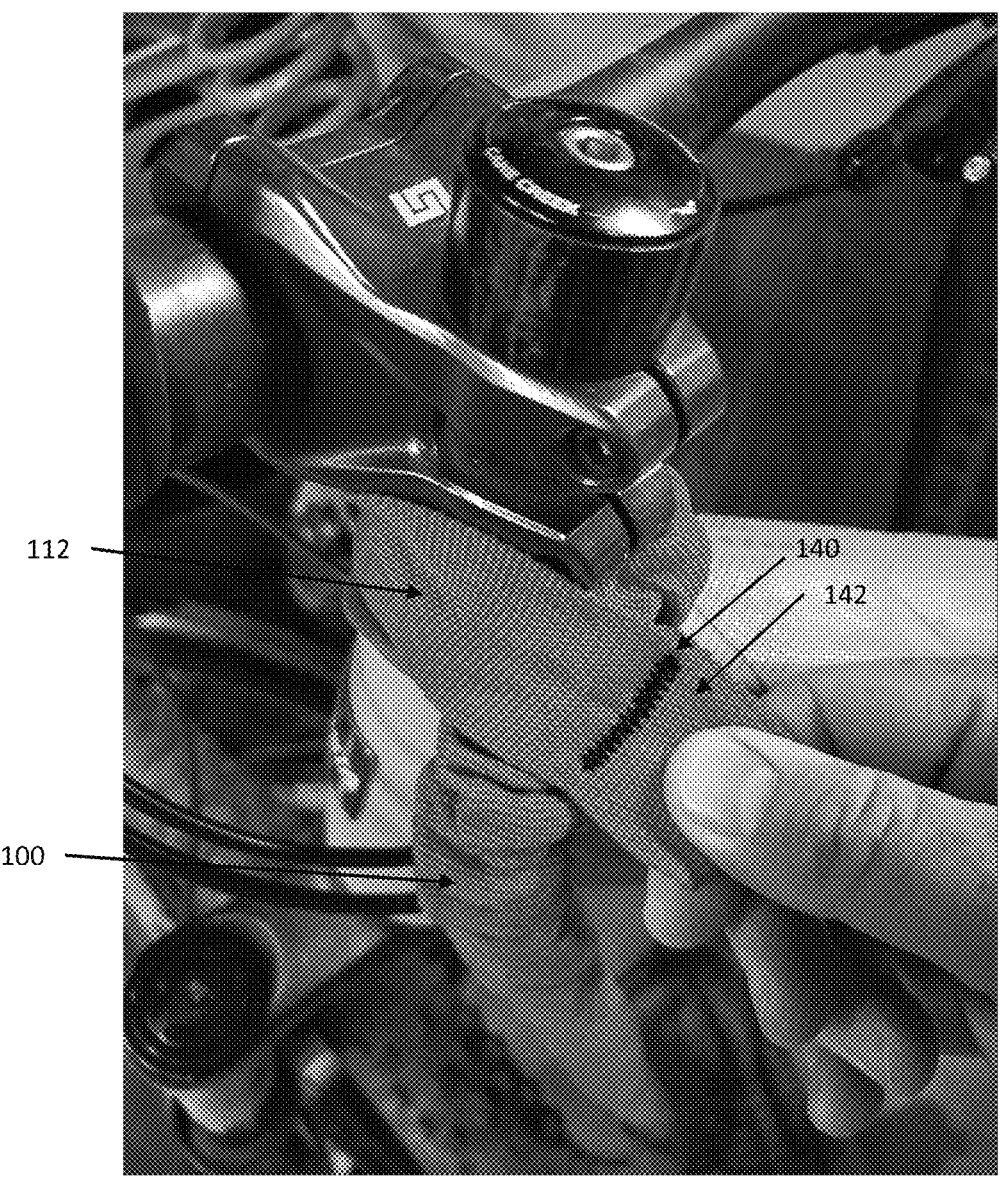
FIG. 9 is a perspective view showing an embodiment of the connecting Y-strap, with the pull tab of FIG. 5, girth hitched around a bicycle.
Figure 10A:
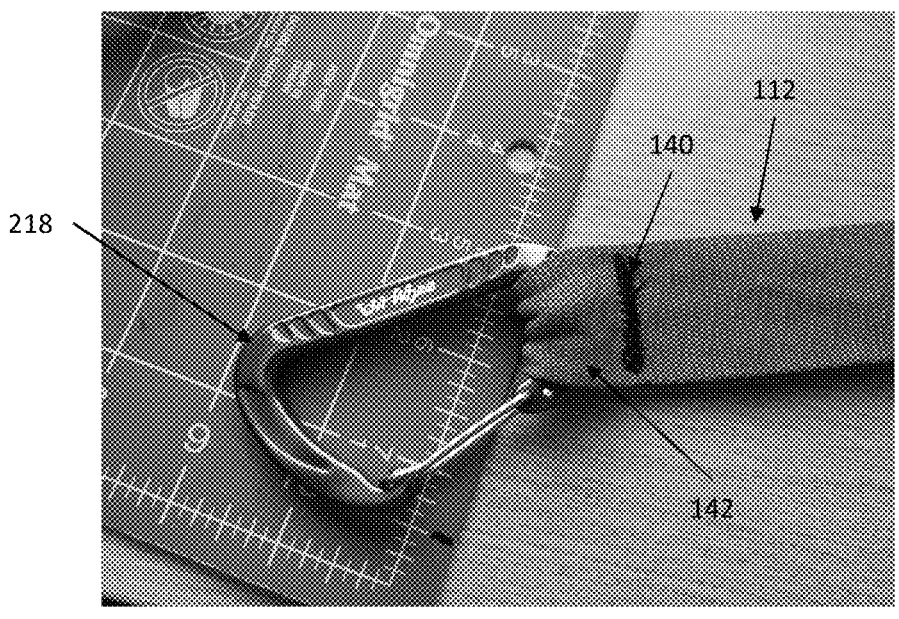
FIG. 10A is a top view of one example of a portion of the end loop of the connecting Y-strap having a carabiner clipped through the pull tab, according to certain embodiments.
Figure 10B:
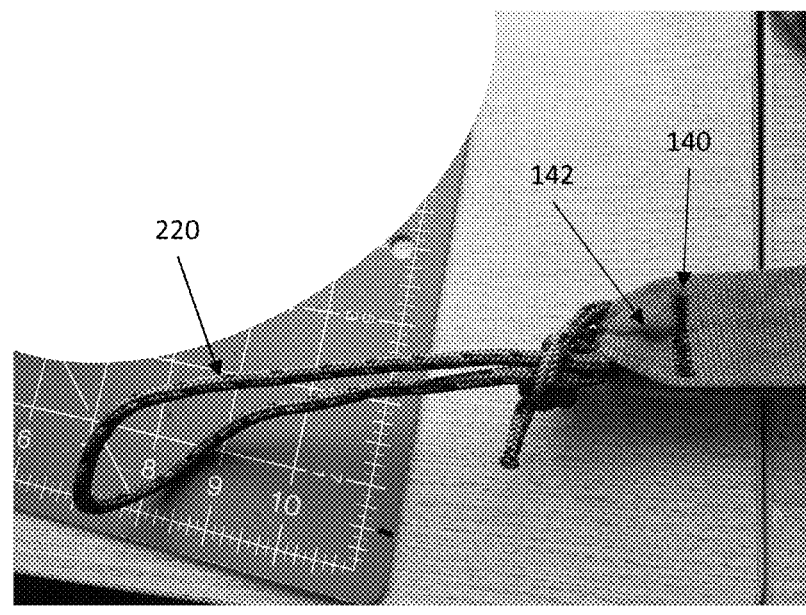
FIG. 10B is a top view of another example of a portion of the end loop of the connecting Y-strap having a connecting cord attached to the pull tab, according to certain embodiments.

Referring to FIG. 8, there is illustrated a portion of one embodiment of the connecting Y-strap 100. In this example, the end loop 112 includes additional stitching 140 that forms a tab 142 at the end of the loop 112. The tab stitching 140 extends through both the free end and the standing end of the material forming the end loop 112 to "seal off" the tab 142 at the tip of the end loop 112 and separate it from the main opening 144 of the end loop 112. Thus, the end loop 112 has the main opening 144 through which the connecting Y-strap 100 is passed in the girth hitch configuration, with the tab 142 separated from the main opening 144 by the tab stitching 140. The tab 142 provides a convenient grip location for a user to hold onto when loosening and removing the knot of the girth hitch to disconnect the connecting Y-strap 100, as shown in FIG. 9. In the example shown in FIG. 9, the single end of the connecting Y-strap 100 is shown girth hitched around the stem of a bicycle. In one example, the tab 142 may have a length of approximately one (1) inch and the remaining portion of the end loop 112 may have a length of approximately five (5) inches. In some examples, as shown in FIG. 8, the tab 142 may form a small secondary loop at the end of the main opening 144 of the end loop 112. This may allow an object to be clipped to the tab 142 without interfering with the use of the end loop 112. For example, a carabiner 218 (FIG. 10A), cord 220 (FIG. 10B), or other object (not shown) may be attached through the small secondary loop of the tab 142 while the main opening 144 of the end loop 112 is used for girth hitching or another style of connection.

Advantageously, the connecting Y-strap 100 described herein has features that provide enhanced safety. For example, the connecting Y-strap 100 tends to smoothly elongate under tension, rather than jerking the user who is being towed. In this regard, it is generally preferred that the webbing sleeve 118 have a small amount of elasticity in order to smooth the transition when the webbing sleeve takes the load at full elongation of the elastic band 120. Moreover, due to the protection provided by the webbing sleeve 118 and the robust nature of the elastic band 120, the connecting Y-strap 100 can be subjected to relatively high forces, and suddenly applied forces, without danger of the inner elastic band 120 failing.

Embodiments of the connecting Y-strap can be used in a wide variety of applications, in addition to the motorcycle application discussed above. For example, the two users may be on skis, paddleboards, skates, e-bikes, bicycles, or other types of sports equipment, or the users can be running, hiking or walking. Rather than assisting with uphill or flat travel, the connecting Y-strap can be used to provide braking during downhill travel, in which case the stronger user would be behind the weaker. The connecting Y-strap can also be used as a dog leash, or when skijoring or bike-joring. In addition, the connecting Y-strap can be used to pull an inanimate object when it is desired to not have a jerky connection, for example when skiing with a sled or pulk.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising." "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the invention should be determined from proper construction of the appended claims, and their equivalents.

What is claimed is:

1. A connecting Y-strap for connecting two motorcycles together, the connecting Y-strap comprising:

a body portion including a webbing sleeve and a band of elastic material disposed within the webbing sleeve, the band of elastic material being secured to the webbing material at each of a first end and a second end of the body portion;

first and second peg strap portions extending in a Y configuration from the first end of the body portion, each of the first and second peg strap portions having a peg loop formed at respective distal ends of the first and second peg strap portions, wherein the first and second peg strap portions have different lengths; and a strap length extending from the second end of the body portion, wherein a distal end of the strap length includes an end loop, wherein the end loop comprises a primary loop and a secondary loop separated from the primary loop.

2. The connecting Y-strap of claim 1, wherein the first and second peg strap portions are extensions of the webbing sleeve.

3. The connecting Y-strap of claim 1, wherein the first and second peg strap portions are sewn into the webbing sleeve at the first end of the body portion.

4. The connecting Y-strap of claim 1, wherein the strap length is an extension of the webbing sleeve.

5. The connecting Y-strap of claim 1, wherein the strap length is sewn into the webbing sleeve at the second end of the body portion.

6. The connecting Y-strap of claim 1, wherein a length of the secondary loop is smaller than a length of the primary loop.

7. The connecting Y-strap of claim 1, wherein the secondary loop is separated from the primary loop by stitching.

8. The connecting Y-strap of claim 1, wherein the secondary loop accommodates a cord or a carabiner.

9. The connecting Y-strap of claim 1, wherein the band of elastic material takes no more than 18 pounds of load before the webbing sleeve engages to take the load.

10. The connecting Y-strap of claim 1, wherein the first and second peg strap portions form an angle of about 90 degrees at the first end of the body portion.

11. The connecting Y-strap of claim 1, wherein the webbing sleeve limits stretching of the band of elastic material.

12. A connecting Y-strap for connecting two motorcycles together, the connecting Y-strap comprising:

a body portion including a webbing sleeve and a band of elastic material disposed within the webbing sleeve, the band of elastic material being secured to the webbing material at each of a first end and a second end of the body portion;

first and second peg strap portions extending in a Y configuration from the first end of the body portion, each of the first and second peg strap portions having a peg loop formed at respective distal ends of the first and second peg strap portions; and a strap length extending from the second end of the body portion, wherein a distal end of the strap length includes a primary loop and a secondary loop separated from the primary loop.

13. The connecting Y-strap of claim 12, wherein the primary loop is between the secondary loop and the second end of the body portion.

14. The connecting Y-strap of claim 13, wherein a length of the secondary loop is smaller than a length of the primary loop.

15. The connecting Y-strap of claim 14, wherein the secondary loop is separated from the primary loop by stitching.

16. The connecting Y-strap of claim 15, wherein the secondary loop accommodates a cord or a carabiner.

17. A connecting Y-strap for connecting two motorcycles together, the connecting Y-strap comprising:

a body portion including a webbing sleeve and a band of elastic material disposed within the webbing sleeve, the band of elastic material being secured to the webbing material at each of a first end and a second end of the body portion;

first and second peg strap portions extending in a Y configuration from the first end of the body portion, each of the first and second peg strap portions having a peg loop formed at respective distal ends of the first and second peg strap portions, wherein the first and second peg strap portions have different lengths; and a strap length extending from the second end of the body portion, wherein a distal end of the strap length includes an end loop.

18. The connecting Y-strap of claim 17, wherein the end loop comprises a primary loop and a secondary loop separated from the primary loop, wherein the primary loop is between the secondary loop and the second end of the body portion, and wherein a length of the secondary loop is smaller than a length of the primary loop.

* * * * *